United States Patent [19]

Kish et al.

[11] Patent Number: 5,117,704

[45] Date of Patent: Jun. 2, 1992

[54] ELASTOMERIC TORSIONAL ISOLATOR

[75] Inventors: Jules G. Kish, Milford; Lionel G. Webb, Stratford, both of Conn.

[73] Assignee: United Technologies, Corporation, Hartford, Conn.

[21] Appl. No.: 525,388

[22] Filed: May 16, 1990

[51] Int. Cl.⁵ .................. F16H 55/14; F16H 37/06; F16D 3/58

[52] U.S. Cl. .......................... 74/411; 74/443; 74/447; 74/661; 464/75; 464/90

[58] Field of Search ............... 74/443, 446, 447, 411, 74/661; 464/75, 90

[56] References Cited

U.S. PATENT DOCUMENTS

| | | | |
|---|---|---|---|
| 95,122 | 9/1869 | Lombard | 74/443 |
| 403,326 | 5/1889 | Burriage | 74/443 |
| 623,883 | 4/1899 | Cameron | 74/443 |
| 2,674,897 | 4/1954 | Heinish | 74/443 X |
| 3,408,830 | 11/1968 | Sutaruk et al. | 74/411 |
| 3,839,922 | 10/1974 | Hiersig et al. | 74/443 X |
| 3,871,248 | 3/1975 | Barish | 74/665 P |
| 4,197,382 | 4/1980 | Fukushima et al. | 525/403 |
| 4,489,625 | 12/1984 | White | 74/665 C |
| 4,674,351 | 6/1987 | Byrd | 74/443 |
| 4,831,897 | 5/1989 | Dobbs | 74/411 |

FOREIGN PATENT DOCUMENTS

| | | | |
|---|---|---|---|
| 0244263 | of 1987 | European Pat. Off. | |
| 331989 | of 1921 | Fed. Rep. of Germany . | |
| 1945264 | 3/1971 | Fed. Rep. of Germany | 74/443 |
| 2438549 | 2/1976 | Fed. Rep. of Germany | 74/446 |
| 1147556 | of 1956 | France . | |
| 579489 | 11/1977 | U.S.S.R. | 74/443 |
| 979541 | 1/1965 | United Kingdom | 74/443 |

Primary Examiner—Allan D. Herrmann
Attorney, Agent, or Firm—William J. Sapone

[57] ABSTRACT

An elastomeric torsional isolator comprises one or more elastomer layers disposed between a spur gear, having a pair of sloped surfaces, and a pair of rims having corresponding surfaces. The rims are attached to a flange extending from a shaft which has pinions for engaging a driven gear. By preloading the elastomer layers, the spur gear is frictionally connected to the flange and shaft, rather than mechanically engaged. The preloaded elastomer layers act as an elastomeric torsional isolator which accommodates variations in mechanical tolerances to balance the torque loading in a split torque drive system. Using elastomer layers for balancing the torque loading between a pair of torque splitting gear assemblies reduces the number of bearings required, increasing reliability and reducing part complexity.

28 Claims, 6 Drawing Sheets

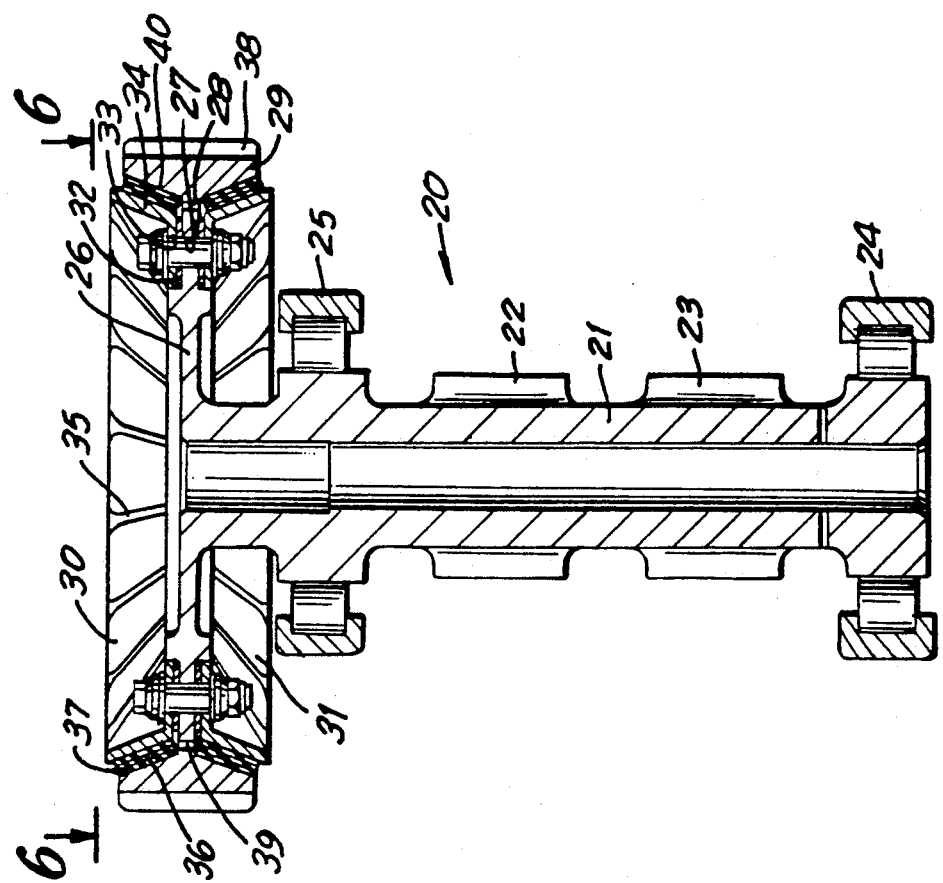
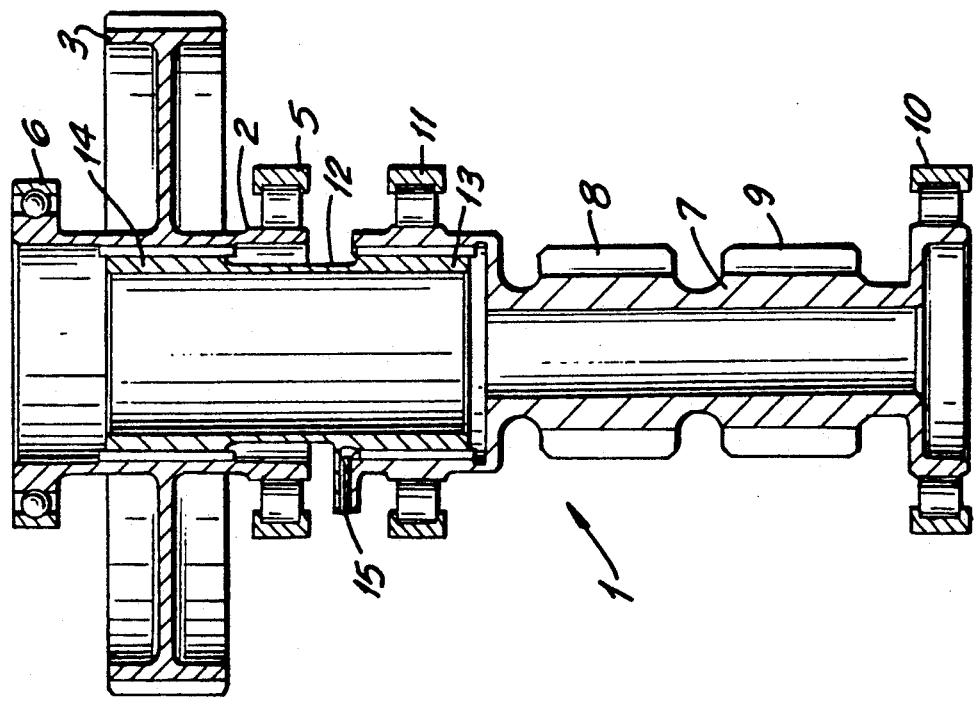
FIG. 2
FIG. 1 PRIOR ART

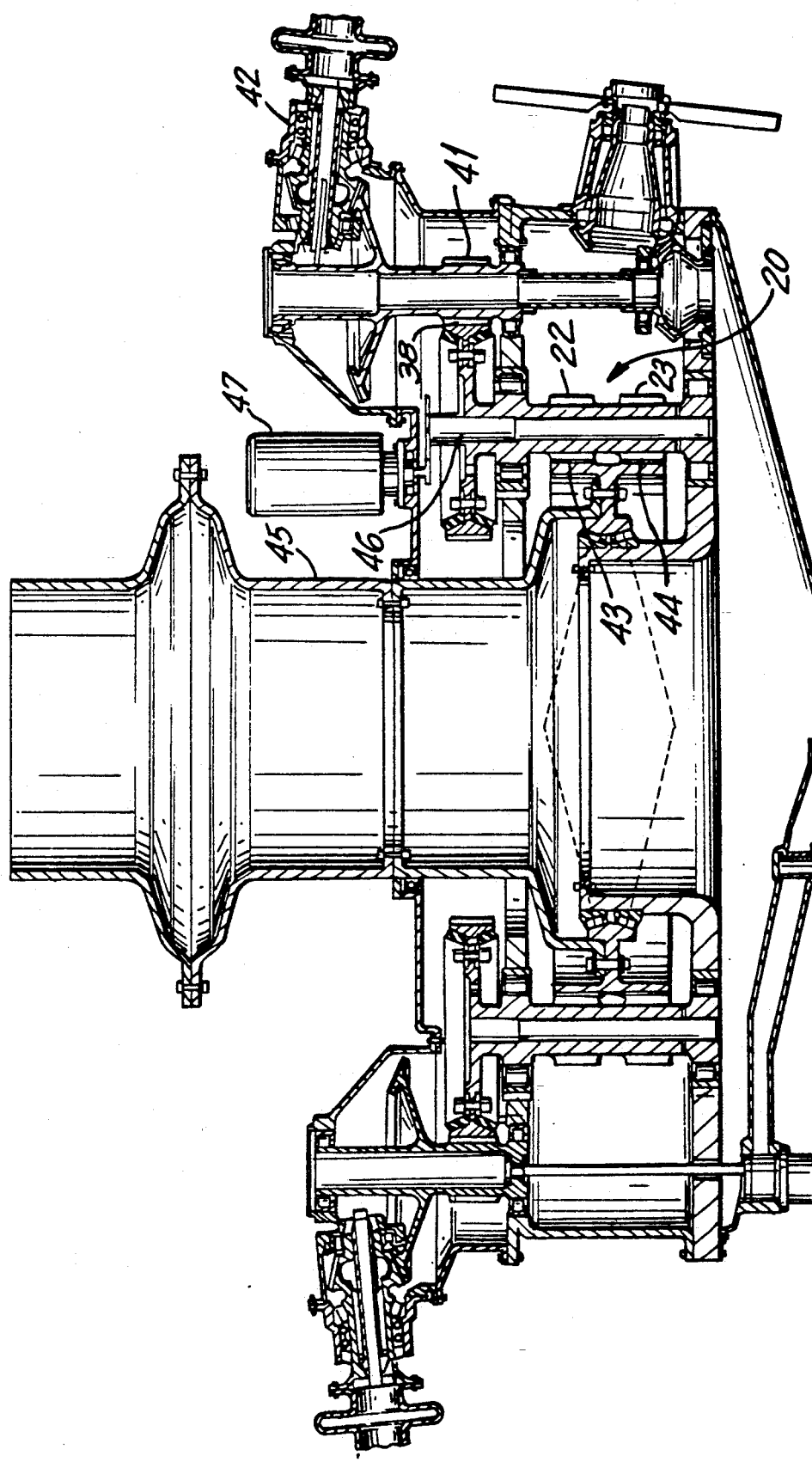

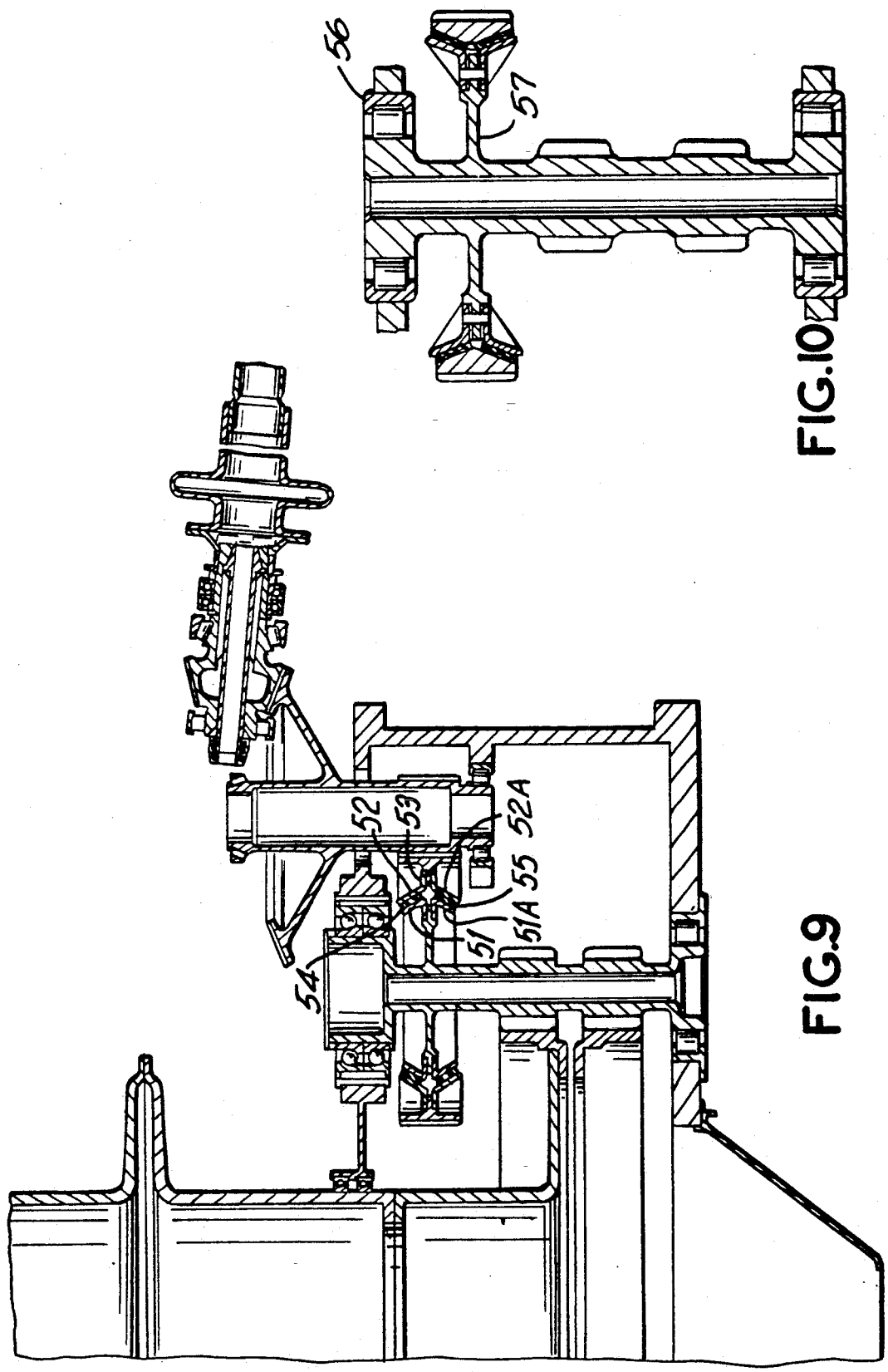

ELASTOMERIC TORSIONAL ISOLATOR

TECHNICAL FIELD

This invention is related to split torque drive systems and more particularly to an elastomeric torsional isolator for balancing the torque loads between a pair of torque splitting gear assemblies.

BACKGROUND OF THE INVENTION

It is known when using gas turbine engines in helicopters to attempt to split the drive train in a transmission section to reduce tooth loading and add redundancy, should one set of gear drives fail during flight. This is accomplished by having a pair of gears driven by an engine, each of the driven gears in turn driving a pair of bull pinions, which engage and drive a bull gear, which rotates the main rotor. Each set of gears (hereinafter the "gear assembly") connected between the engine and the bull gear, provides a separate drive path, each assembly capable of transmitting 100% of the engine's output to the rotor to maintain operation should one assembly fail.

The problem in designing such a redundant system is to assure even splitting of the load between the gear assemblies, as even the slightest deviation in machining tolerance in the gearing can result in a 100% split, i.e., one gear assembly transfers the entire torque load while the other assembly essentially free-wheels. This results in excessive wear and stress on the loaded assembly.

A quill shaft was used in the previous arrangement for accommodating variations in torque loading to provide even splitting between the gear assemblies. Referring to FIG. 1, a prior art gear assembly 1 is shown. The assembly uses a driven gear shaft 2, with a driven gear 3 mounted thereon, the shaft 2 supported by a pair of bearings 5 and 6. A pinion shaft 7, with a pair of bull pinions 8 and 9 mounted thereon, is also supported by a pair of bearings 10 and 11. Between these shafts 2 and 7 is disposed a quill shaft 12 having a helically splined end 13 and a straight splined end 14, which mate with splined interior sections in the driven and pinion shafts. The quill shaft allows adjustment of the gear tooth alignment between the driven and pinion shafts using a shim 15. By shimming the quill shaft, adequate torque splitting is assured, and thus, the gear assembly accommodates variations in machining tolerances.

While effective, such an assembly is complex to produce and assemble and requires multiple bearings which increase the weight penalty while reducing the assembly's useful life.

SUMMARY OF THE INVENTION

It is an object of the present invention to reduce the weight and complexity of a split torque drive system.

It is another object to provide simplified means for balancing the torque loading on a pair of split torque drive systems.

It is yet another object to increase the reliability of a split torque drive system.

These and other objects of the present invention are achieved by providing a split torque drive system having at least one gear assembly comprising a shaft having a drive end and a driven end, and further comprising elastomeric means interposed at the driven end between an outer gear engaging portion and an inner shaft portion, the elastomer preloaded to accommodate variations in torque loading.

DESCRIPTION OF THE DRAWINGS

FIG. 1 is a prior art gear assembly using a quill shaft.

FIG. 2 is a cross sectional view of a gear assembly using an elastomeric torsional isolator.

FIG. 3 is a cross sectional view of the gear assembly of FIG. 2 mounted in a helicopter transmission.

FIG. 9 is an illustrative view of an alternative embodiment of the present invention showing the elastomer compressed inwardly.

FIG. 10 is an illustrative view of an alternative embodiment of the present invention wherein the second bearing is disposed outwardly of the gear assembly, rather than inwardly.

DETAILED DESCRIPTION OF THE INVENTION

Figure 4:
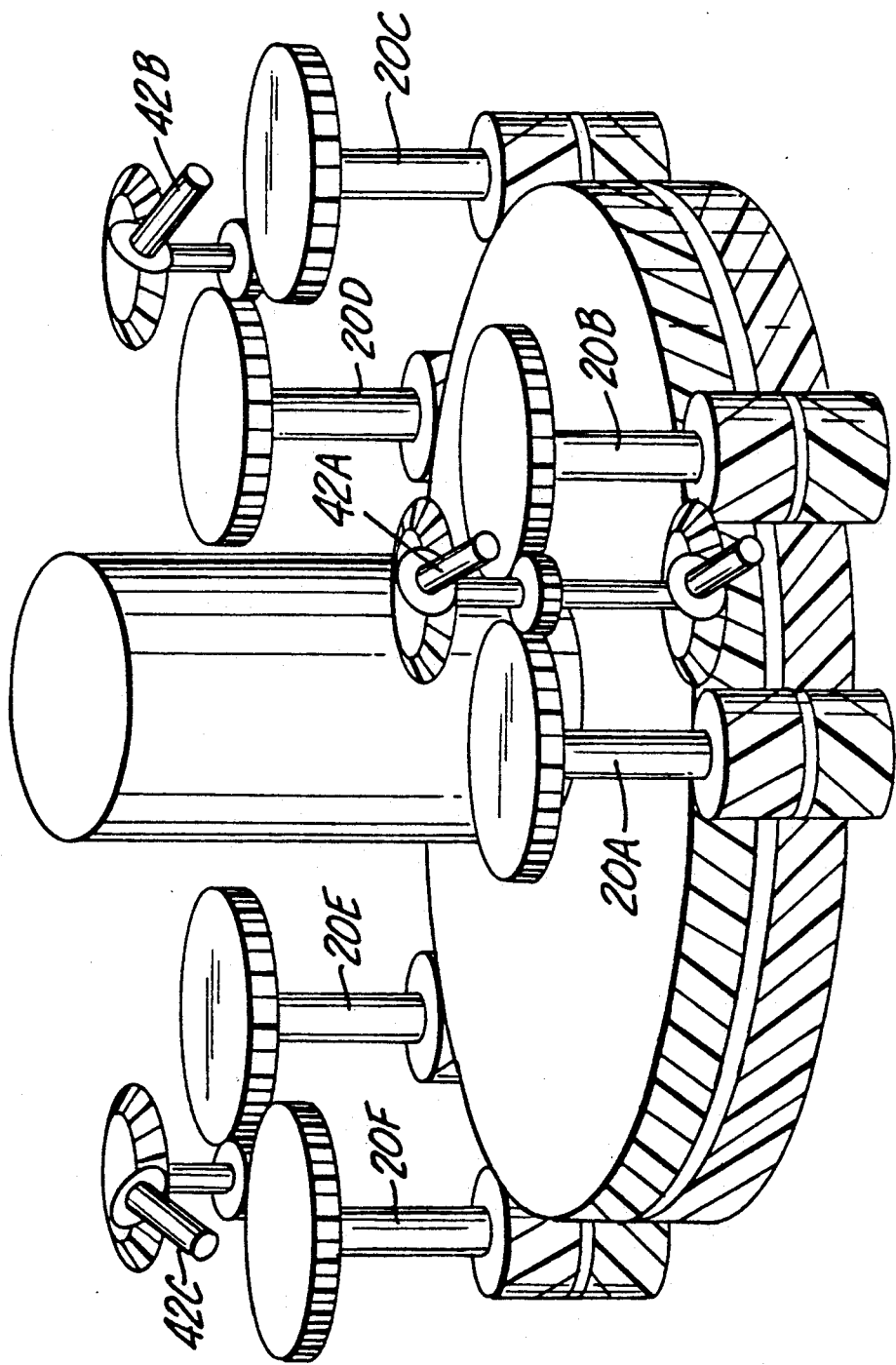
FIG. 4 is a perspective view of a three engine arrangement using six gear assemblies.

Referring to FIG. 2, a gear assembly 20 incorporating the present invention is shown. The assembly 20 has a central shaft 21 and a pair of bull pinions 22 and 23 formed thereon. The shaft 21 is supported by a lower bearing 24 and an upper bearing 25. A gear flange 26 is provided on the upper end of the shaft and has bolt holes 27 extending about an outer periphery thereof. The flange 26 has teeth 28 on the outer circumference thereof.

A spur gear 29 is held to the flange 26 using upper and lower rims 30 and 31. The upper and lower rims are essentially identical and thus, only the upper rim will be described. The upper rim 30 comprises a flat circular disk 32 having bolt holes 33 and an angled outer wall 34. Gussets 35 provided between the wall and the disk, increase the stiffness of the rim to minimize deflection. One or more elastomer layers 36 are bonded to an outer surface 37 of the wall 34. As shown, 3 elastomeric layers are bonded to the rim. These elastomer layers act as an elastomeric torsional isolator, as will hereinafter be described. The spur gear 29 has outer spline teeth 38 and inner spline teeth 39 and has an inner surface 40 which corresponds in angle to the outer rim surface 37. The inner surface 40 engages the outer elastomer layer.

Referring to FIG. 3, the inventive gear assembly 20 is shown utilized in a helicopter drive system. While exemplary, it will be understood that the present invention is not limited to this particular application and may be used in any split torque drive system.

Referring again to FIG. 3, the assembly 20 has its outer spur spline teeth 38 engaging a drive pinion 41 which is driven by a gas turbine engine 42. The pinions 22 and 23 are engaged to bull gears 43 and 44 which in turn drive the helicopter main rotor shaft 45. The assembly 20 additionally has a shaft extension 46 for driving a hydraulic pump 47. Such an accessory drive system may be optionally driven through the gear assembly without affecting operation of the elastomeric torsional isolator.

Referring to FIG. 4, a three engine drive system is illustratively shown, demonstrating how the torque from three gas turbine engines (42A, B and C) would be split along six gear assemblies (20A, 20B, 20C, 20D, 20E, and 20F) for driving a helicopter rotor. As illustrated, so long as an engine is operational and at least one of the gear assemblies is operational, then torque will be transmitted from one of the engines to the bull gear for rotating the main rotor. Conversely, as long as one of the gear assemblies is operational, then torque may be driven in a reverse direction by the bull gear to drive accessories.

Figure 5:
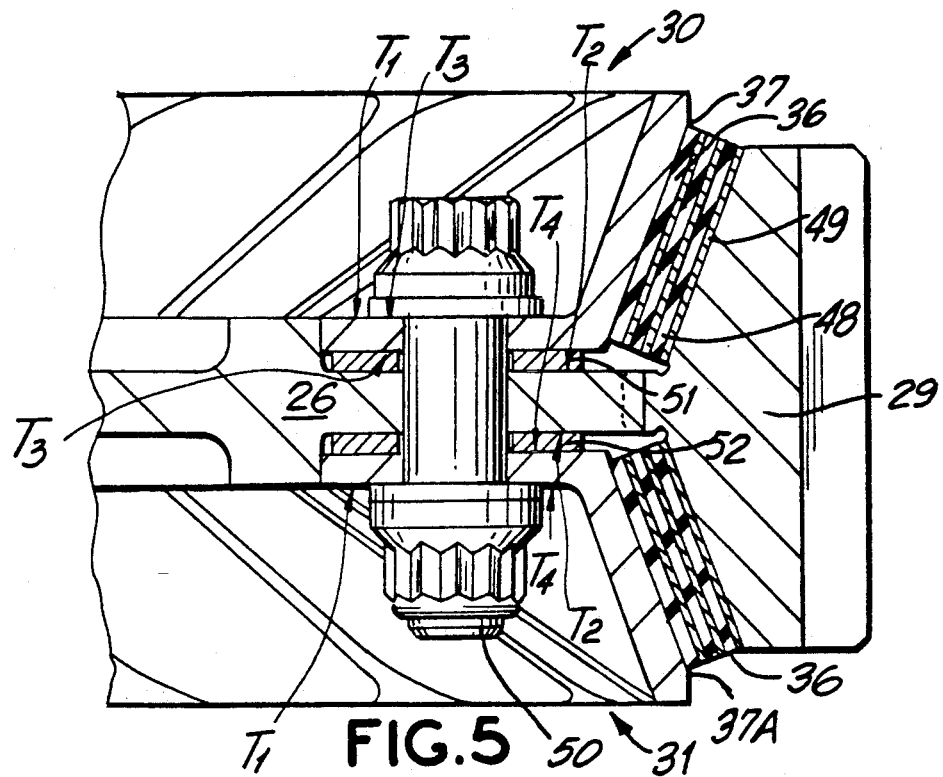
FIG. 5 is an enlarged view of the elastomeric torsional isolator.

Referring to FIG. 5, an enlarged view of the elastomeric torsional isolator is shown. The upper and lower rims 30 and 31 together comprise a sub-assembly with the outer wall surfaces 37 and 37A forming a conical pocket for accepting the spur gear. Each rim has three elastomeric layers 36A, B and C bonded to the outer surface thereof. Each layer preferably comprises an elastomer 48 and a metal backing strip 49 laminated thereto. While three layers are shown, any number of layers may be used. For example, one solid elastomer block may be sufficient for some applications. Up to about 6 elastomer layers are contemplated. The elastomer may be of any type and is preferably either a nitrile rubber or a fluorocarbon rubber, a fluoroelastomer rubber or a fluorosilicon rubber. For example, polyvinylidene fluoride cohexafluoro propylene may be used. These materials are preferable due to their excellent high temperature properties and resistance to gear box and hydraulic oils. It is also contemplated that different types of elastomers may be combined to adjust properties. The metal backing strip may be composed of steel, stainless steel, titanium or another metal or alloy. The elastomer layers may be bonded to the rim using adhesives or any known process, however, vulcanizing in a closed mold is preferred.

The elastomer layers act as an elastomeric torsional isolator and are preloaded to provide a precompressive load in the elastomer as the elastomer is poor in tension. The axial and radial spring rates are preferably stiff, while the torsional spring rate is preferably soft. For example, in a helicopter split torque drive system, the following spring rates are desirable: $K_{axial}=1,490,000$ lbs./in., $K_{radial}=2,750,000$ lbs./in. and $K_{torsional}=570,000$ inch lbs./radian.

The elastomeric torsional isolator preferably permits about 0.080 to 0.016 inches of torsional deflection, at the radius of the gear teeth. The upper and lower rims, when bolted together, clamp the elastomer to the spur gear to precompress the elastomer with the angle of the outer surfaces facilitating the preload. The preload provides a high normal force which maintains a high frictional force for driving torque across the elastomer interface to the spur gear without tooth engagement. Thus, the spur gear is driven frictionally, rather than through direct meshing of the flange spline teeth and inner spur spline teeth. Consequently, the elastomer accommodates the difference in machine tolerance to assure that the torque is split evenly between a pair of gear assemblies.

Referring still to FIG. 5, a series of bolts 50 provides the preload required to compress the elastomeric layers for frictionally driving the spur gear. However, each bolt requires two shims 51 and 52 to adjust the preload. To determine the shim thickness, the upper and lower rims 30 and 31 are snugly bolted to the flange 26. A measurement T1 is taken, as illustrated in FIG. 5, preferably at three equally spaced positions around the rim. The rims are disassembled and the thicknesses T2, T3 and T4 are measured, again preferably in three locations. The shim thickness is calculated to provide a 0.010 inch clamp on each shim according to the following formulas:

Upper shim thickness $=[(T1-T2)/2]-T3-0.010$.
Lower shim thickness $=[(T1-T2)/2]-T4-0.010$.

Figure 6:
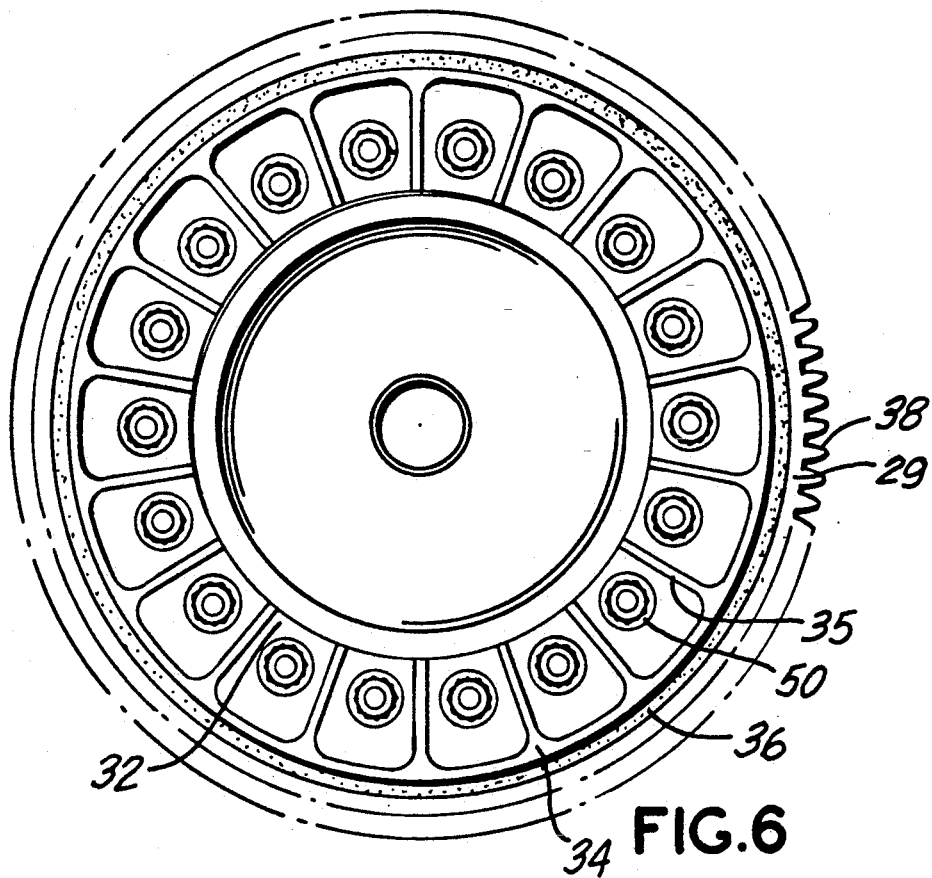
FIG. 6 is a top view of the gear assembly of FIG. 2 taken along line 6—6.

FIG. 6 shows a top view of the upper rim and spur gear.

Figure 7:
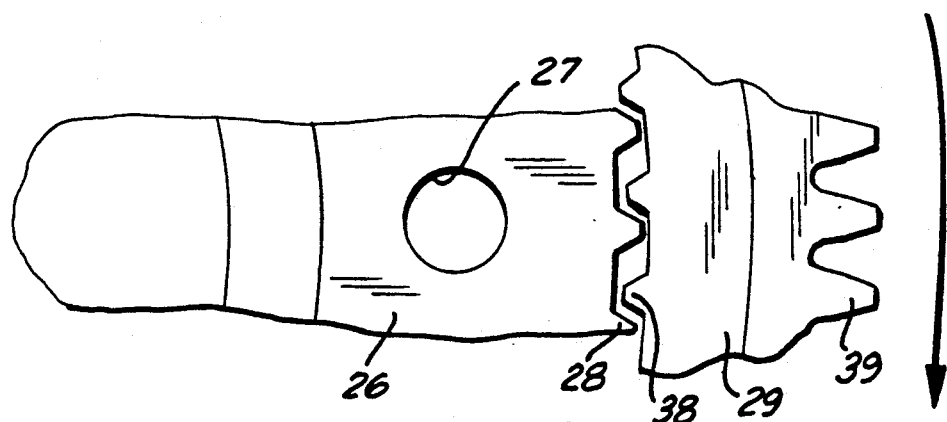
FIG. 7 is an enlarged cross sectional view showing the spur gear and flange gear spacing.

Referring to FIG. 7, the relationship between the inner and outer spline teeth of the spur gear and flange spline teeth is shown. In operation, the spur gear 29 is frictionally held to prevent contact of the internal spline teeth 38 and external flange spline teeth 28. These splines are separated by a gap maintained during normal operation, which may be accommodated by eliminating every other spline tooth around the flange. When an overtorque condition occurs, or should the elastomer fail, the spur gear internal spline teeth will engage the external flange spline teeth and thus, continue to drive the pinion and bull gear. Thus, the inventive gear assembly provides an additional backup system to maintain operation if the elastomer should fail.

Figure 8:
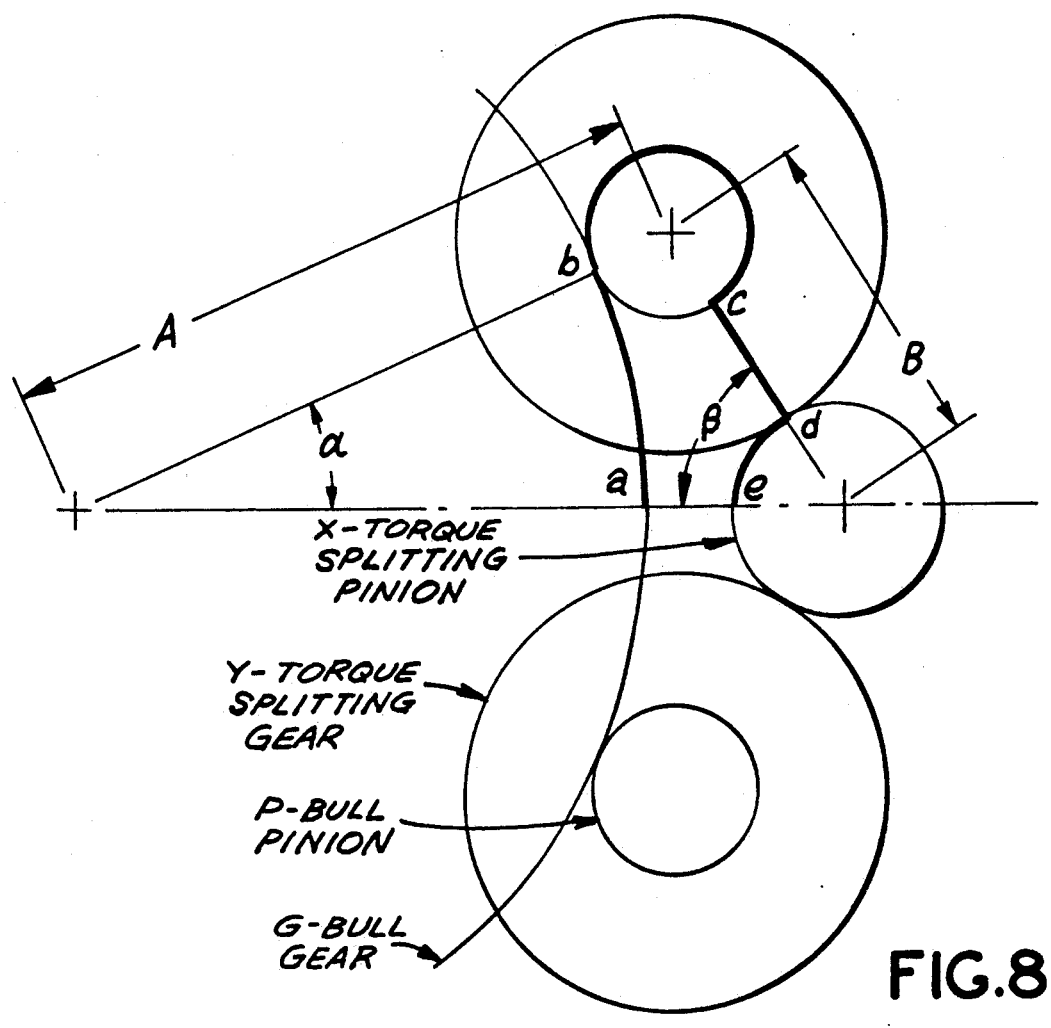
FIG. 8 is a illustrative view showing the derivation of the tooth geometry relationships for the torque splitting drive.

FIG. 8 shows the derivation of the tooth geometry relationships for the torque splitting drive.

Referring to FIG. 9, another embodiment of the present invention is shown. In this embodiment, outer walls 51 and 51A are angled inwardly, rather than outwardly, with the spur gear mating surfaces 52 and 52A correspondingly angled. An additional set of bolt holes 53 are provided to provide bolts on both sides of the elastomeric layers 54. However, the other parts of the assembly are essentially the same as the previous embodiment. This design is believed more useful in self-alignment applications as the elastomeric isolator is softer than in the previous design. In essence, the previous embodiment compressed the elastomer such that it was driven outwardly, while in this embodiment, the angled surfaces drive the elastomer inwardly. Consequently, it is contemplated that the surfaces may deviate from a normal axis 55 by up to plus or minus about 45°, depending on the application.

Referring to FIG. 10, another embodiment is shown where an upper bearing 56 is provided outwardly of a flange 57, rather than inwardly. This increases the spread between the bearings, facilitates assembly and may be preferable in certain applications. Either design is equally feasible as both provide improved life by reducing the number of bearings required in the gear assembly.

Utilizing the present invention, a torque splitting drive system can be provided which evenly balances torque transmission with reduced weight and complexity. Such a torque drive system eliminates at least two bearings per shaft, four bearings per engine, while also providing fail safe operation in overtorque conditions or where the elastomer may fail. Also, such a design eliminates the need for the three shaft gear assembly of the prior art, utilizing instead a single shaft design. This allows reducing the overall length, weight and complexity of the drive system.

While a preferred embodiment of the present invention has been shown and described, it will be understood by those skilled in the art that various changes could be made without varying from the scope of the present invention.

What is claimed is:

1. A split torque drive system having drive means connected through a pair of gear assembly means to a driven means, each gear assembly means having a shaft, means for engaging the driven means provided on the shaft, and means for engaging the drive means provided on the shaft, the gear assembly means further comprising flange means mounted on the shaft, the flange means having a pair of outer surfaces angled relative to each other, spur means having a pair of angled surfaces, disposed in a facing relationship to the pair of flange means angled outer surfaces, and, at least one elastomer layer disposed between the spur gear angled surfaces and the flange angled surfaces for preloading the elastomer layer therebetween, thereby frictionally transmitting torque from the spur means through the shaft to the driven means.

2. The split drive system of claim 1, wherein the flange means comprises a pair of rims attached to a flange provided on the shaft.

3. The split drive system of claim 2, wherein the rims ar bolted to the flange to preload the elastomer layer.

4. The split drive system of claim 1, wherein each elastomer layer comprises an elastomer bonded to a metal backing strip.

5. The split drive torque system of claim 4, wherein the elastomer is nitrile rubber.

6. The split drive system of claim 4, wherein the elastomer is a fluoroelastomer.

7. The split drive system of claim 6, wherein the fluoroelastomer is a fluorocarbon or fluorosilicon elastomer.

8. The split drive system of claim 1, wherein the gear assembly further comprises a pair of bearings, one disposed at a lower end of the shaft and one disposed at an upper end of the shaft for rotationally supporting the assembly.

9. The split drive system of claim 1, wherein the driven means is a bull gear and wherein the means for engaging the bull gear comprises a pair of pinions.

10. The split drive system of claim 1, wherein the flange means angle surfaces and spur gear means angled surfaces are angled at plus or minus 45 degrees relative to a normal axis thereof.

11. The split drive system of claim 1, wherein the angled surfaces are angle outwardly, relative to the shaft to preload the elastomer layers in an outward direction.

12. The split drive system of claim 1, wherein the angled surfaces are angled inwardly to preload the elastomer layers in an inward direction.

13. The split drive system of claim 1, wherein the drive means comprises a gas turbine engine communicating through a pinion to the gear assembly means and further comprising outer splined teeth disposed on the outer circumference of the spur means for engaging the engine pinion.

14. A split torque drive system having drive means connected through a pair of gear assembly means to a driven means, each gear assembly means having a shaft, means for engaging the driven means provided on the shaft, and means for engaging the drive means provided on the shaft, the gear assembly means further comprising flange means mounted on the shaft, the flange means having a pair of angled outer surfaces spur means having a pair of angled surfaces, disposed in a facing relationship to the pair of flange means angled outer surfaces, and, at least one elastomer layer disposed between the spur gear angled surfaces and the flange angled surfaces for frictionally transmitting torque from the spur means through the shaft to the driven means, and, inner spine teeth provided on an inner surface of the spur means and outer spline teeth provided on the circumference of the flange means, the teeth disposed in proximity to each other, separated by a gap unless an overtorque condition occurs.

15. The split drive system of claim 14, wherein the flange means comprises a pair of rims attached to a flange provided on the shaft.

16. The split drive system of claim 15, wherein the rims are bolted to the flange to preload the elastomer layer.

17. The split drive system of claim 14, wherein each elastomer layer comprises an elastomer bonded to a metal backing strip.

18. The split drive torque system of claim 14, wherein the elastomer is nitrile rubber.

19. The split drive system of claim 14, wherein the elastomer is a fluroelastomer.

20. The split drive system of claim 19, wherein the fluoroelastomer is a fluorocarbon or fluorosilicon elastomer.

21. The split drive system of claim 14, wherein the gear assembly further comprises a pair of bearings, one disposed at a lower end of the shaft and one disposed at an upper end of the shaft for rotationally supporting the assembly.

22. The split drive system of claim 14, wherein the driven means is a bull gear and wherein the means for engaging the bull gear comprises a pair of pinions.

23. The split drive system of claim 14, wherein the flange means angled surfaces and spur gear means angled surfaces are angled at plus or minus 45 degrees relative to a normal axis thereof.

24. The split drive system of claim 14, wherein the angled surfaces are angled outwardly, relative to the shaft to preload the elastomer layers in an outward direction.

25. The split drive system of claim 14, wherein the angled surfaces are angled inwardly to preload the elastomer layers in an inward direction.

26. The split drive system of claim 14, wherein the drive means comprises a gas turbine engine communicating through a pinion to the gear assembly means and further comprising outer splined teeth disposed on the outer circumference of the spur means for engaging the engine pinion.

27. The split drive system of claim 14, wherein the angled surfaces are angled inwardly to preload the elastomer layers in an inward direction.

28. The split drive system of claim 14, wherein the drive means comprises a gas turbine engine communicating through a pinion to the gear assembly means and further comprising outer splined teeth disposed on the outer circumference of the spur means for engaging the engine pinion.

* * * * *

UNITED STATES PATENT AND TRADEMARK OFFICE
CERTIFICATE OF CORRECTION

PATENT NO. : 5,117,704

DATED : June 2, 1992

INVENTOR(S) : Jules G. Kish & Lionel G. Webb

It is certified that error appears in the above-identified patent and that said Letters Patent is hereby corrected as shown below:

Column 1, line 3, insert the following paragraph --The invention described herein was made in the performance of work under NASA Contract No. NAS3-25423. A waiver of rights has been granted.--

Signed and Sealed this

Twenty-first Day of September, 1993

Attest:

*Attesting Officer*

BRUCE LEHMAN

*Commissioner of Patents and Trademarks*